United States Patent
Brown et al.

(10) Patent No.: US 10,941,742 B2
(45) Date of Patent: Mar. 9, 2021

(54) PERFORATED INTEGRAL FILTER SLEEVE FOR FUEL INJECTOR AND FUEL SYSTEM SETUP METHOD

(71) Applicant: Caterpillar Inc., Deerfield, IL (US)

(72) Inventors: Aaron Michael Brown, Tuscon, AZ (US); Cory A Brown, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 189 days.

(21) Appl. No.: 15/948,618

(22) Filed: Apr. 9, 2018

(65) Prior Publication Data

US 2019/0309719 A1    Oct. 10, 2019

(51) Int. Cl.
| | |
|---|---|
| *F02M 61/16* | (2006.01) |
| *B01D 29/31* | (2006.01) |
| *F02M 53/04* | (2006.01) |
| *F02M 51/00* | (2006.01) |

(52) U.S. Cl.
CPC .......... *F02M 61/165* (2013.01); *B01D 29/31* (2013.01); *F02M 51/00* (2013.01); *F02M 53/043* (2013.01); *F02M 61/168* (2013.01); *F02M 2200/27* (2013.01); *F02M 2200/8061* (2013.01)

(58) Field of Classification Search
CPC .............. F02M 61/165; F02M 61/168; F02M 2200/27; F02M 37/22; F02M 37/48
See application file for complete search history.

(56) References Cited

U.S. PATENT DOCUMENTS

| | | | | |
|---|---|---|---|---|
| 4,678,124 A | * | 7/1987 | Hafner ................. | F02M 51/005 239/585.3 |
| 4,798,329 A | * | 1/1989 | Mesenich .......... | F02M 51/0632 239/5 |
| 5,088,650 A | * | 2/1992 | Takagi ................... | B01D 35/02 239/575 |
| 5,312,050 A | * | 5/1994 | Schumann ......... | F02M 51/0639 239/585.1 |
| 6,283,390 B1 | * | 9/2001 | Brendle ............... | B23K 15/085 239/533.2 |
| 6,446,885 B1 | | 9/2002 | Sims, Jr. et al. | |
| 6,502,385 B2 | | 1/2003 | Haeseler et al. | |
| 7,070,127 B2 | | 7/2006 | Maier | |
| 9,605,638 B2 | | 3/2017 | Falaschi et al. | |
| 2007/0181713 A1 | * | 8/2007 | Mueller ............... | F02M 61/165 239/575 |

(Continued)

FOREIGN PATENT DOCUMENTS

| | | |
|---|---|---|
| DE | 102006014243 | 10/2007 |
| DE | 102015226528 A1 | 6/2017 |

(Continued)

*Primary Examiner* — Sizo B Vilakazi
*Assistant Examiner* — Anthony L Bacon
(74) *Attorney, Agent, or Firm* — Brannon Sowers & Cracraft

(57) ABSTRACT

An engine head assembly includes a plurality of fuel injectors each positioned within a fuel injector bore in the engine head, and each being fluidly coupled with a fluid conduit. Each fuel injector includes a valve assembly positioned within a fuel injector case that includes an elongate body having an opening. A filter sleeve having a particle-blocking perforation array structured to block particles is press fit on the fuel injector case to form a fluid flow path from the fluid conduit into the fuel injector case.

20 Claims, 6 Drawing Sheets

(56) References Cited

U.S. PATENT DOCUMENTS

| | | | | |
|---|---|---|---|---|
| 2008/0164348 A1* | 7/2008 | Brauneis | ............... | F02M 61/14 |
| | | | | 239/533.2 |
| 2015/0041565 A1* | 2/2015 | Mueller | ................ | F02M 37/22 |
| | | | | 239/575 |
| 2016/0220926 A1* | 8/2016 | Caceres | ............... | F02M 61/165 |
| 2017/0009718 A1* | 1/2017 | Caceres | .............. | F02M 61/165 |
| 2018/0209390 A1* | 7/2018 | Caceres | ................ | B01D 29/58 |

FOREIGN PATENT DOCUMENTS

| | | |
|---|---|---|
| EP | 0971124 | 1/2000 |
| EP | 2811151 A1 | 12/2014 |

\* cited by examiner

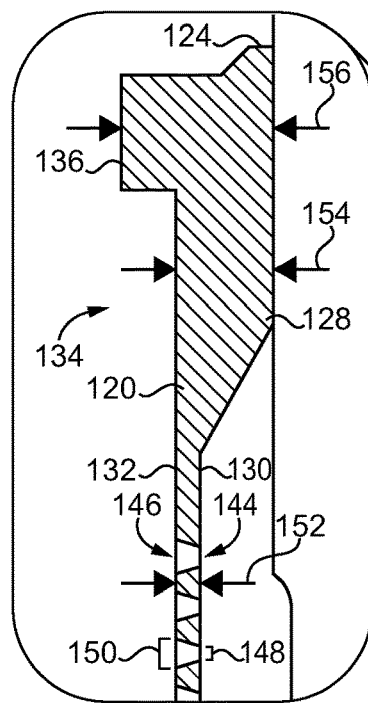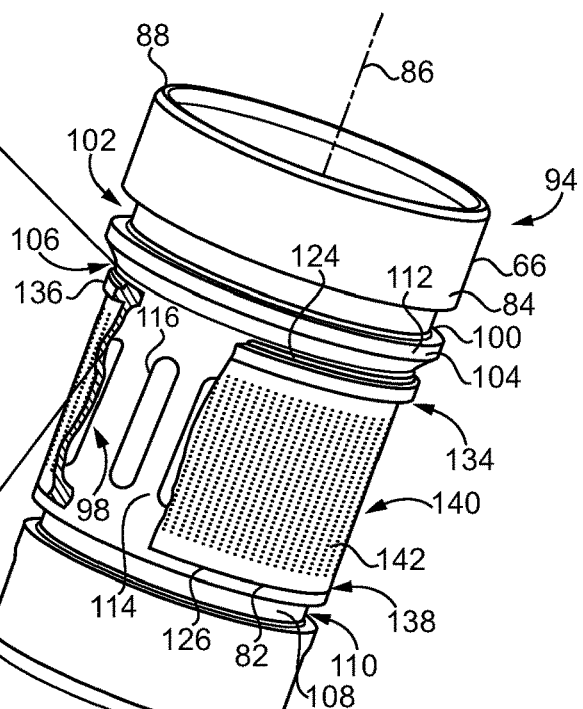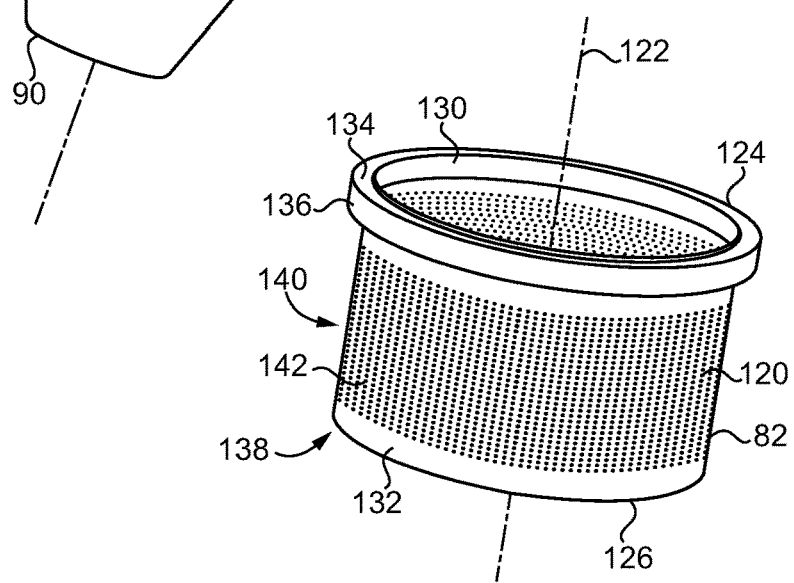
FIG. 4
FIG. 5

PERFORATED INTEGRAL FILTER SLEEVE FOR FUEL INJECTOR AND FUEL SYSTEM SETUP METHOD

TECHNICAL FIELD

The present disclosure relates generally to fuel injectors and, more particularly, to a perforated unitary bodied filter sleeve for a fuel injector.

BACKGROUND

A wide variety of fuel systems for internal combustion engines are well known and widely used, with most modern liquid fuel systems including a fuel injector for delivering metered quantities of a fuel to a combustion chamber. Over the past century, an almost innumerable variety of fuel injector designs have been developed responsive to various operating parameters and operating conditions in an effort to optimize engine performance and operation in one or more ways. Even today, innovation in this field remains robust as efforts to reduce emissions, amongst others, has given rise to new engineering challenges that have been the focus of much inventive effort. For example, the desire to reduce emissions has led to more precisely engineered fuel injectors designed to deliver consistent, accurate quantities of fuel in an effort to achieve cleaner, more reliable, and more complete combustion reactions.

In recent years, engineers have discovered that relatively high fuel injection pressures, and rapid, yet highly precise movement and/or positioning of fuel injector components can offer various advantages relating to emissions composition, efficiency, and other engine operating and performance parameters. Various efforts to reduce emissions and/or to increase performance—notably the use of relatively powerful and frequently energized solenoid electrical actuators—have also contributed to relatively high operating temperatures within the fuel injectors. To operate optimally under relatively harsh conditions at such high temperatures, fuel injector components are often machined to tight tolerances. Excess heat is known to cause dimensional instability of the fuel injectors, potentially resulting in unreliable injector performance, and can additionally result in varnishing, lacquering, or other problems which can lead to adverse effects on injector performance.

One common strategy for addressing the problem of high operating temperatures involves delivering a cooling fluid, such as fuel, to the fuel injector such that some of the heat energy generated by the fuel injector is dissipated to the cooling fluid. Fuel delivered for cooling purposes, and in general fuel supplied to fuel injectors for any purpose, can be contaminated with particles, which can cause obstruction of nozzle outlets in the injector, cause wear at the close tolerances of the injector components, or otherwise damage the injector or result in unacceptable injector performance.

Various strategies have been proposed for protecting fuel injector components from potentially contaminating particles. Most of these strategies involve adding a filter upstream of the fuel injector or adding a multi-piece screening device to the fuel injector. For example, U.S. Pat. No. 9,605,638 to Falaschi et al. ("Falaschi") discloses an internal, multi-piece filter assembly for a fuel injector. The filter assembly in Falaschi is mounted within an electromagnetic actuator. Falaschi's filter assembly includes a mounting portion and sleeve portion that is apparently configured to arrest particles of a certain size that have breached the fuel injector case. While this and other strategies prevent contamination under certain conditions, there remains ample room for improvement and development of alternative strategies.

SUMMARY OF THE DISCLOSURE

In one aspect, a filter sleeve for a fuel injector includes a unitary body defining a longitudinal axis and has a first axial end, a second axial end, and an inner peripheral surface structured for positioning about a fuel injector body having a fuel opening formed therein. The unitary body further includes a first end segment that has the first axial end and an outwardly projecting lip extending circumferentially around the unitary body, a second end segment that includes the second axial end, and a filtration segment positioned axially between the first end segment and the second end segment. The filtration segment has a particle-blocking perforation array with a circumferential distribution of perforations and an axial distribution of perforations in the unitary body, and each of the first end segment and the second end segment being continuous such that the unitary body is unperforated within the first end and the second end segments for forming seals with the fuel injector body.

In another aspect, a fuel injector includes an electrically actuated valve assembly, a nozzle piece defining a nozzle outlet, a fuel injector case coupled with the nozzle piece, the fuel injector case having the electrically actuated valve assembly positioned at least partially therein, and having a fuel supply segment that includes a fuel opening formed therein and extending through the fuel injector case, and a filter sleeve including a unitary body defining a longitudinal axis, the unitary body having a first end segment that includes a first axial end of the unitary body, a second end segment that includes a second axial end of the unitary body, and a filtration segment. The filtration segment is positioned axially between the first end segment and the second end segment, and the filter sleeve is positioned upon the fuel injector case within the fuel supply segment such that at least a portion of the electrically actuated valve assembly is positioned axially between the first end segment and the second end segment. The filtration segment also includes a particle-blocking perforation array having a circumferential distribution of perforations and an axial distribution of perforations in the unitary body.

In still another aspect, a method of setting up a fuel system for an engine includes positioning a filter sleeve having a unitary body upon a fuel injector case, attaching the filter sleeve to the fuel injector case by way of an interference fit connection, establishing fluid communication between perforations in a particle-blocking perforation array of the filter sleeve and a fuel opening formed in the fuel injector case by way of the positioning of the filter sleeve upon the fuel injector case, and installing in an engine housing a fuel injector that includes the filter sleeve, the fuel injector case, and an electrically actuated valve assembly, such that the particle-blocking perforation array is positioned to filter fuel flowing from a fuel conduit in the engine housing into the fuel opening to cool the electrically actuated valve assembly.

BRIEF DESCRIPTION OF THE DRAWINGS

FIG. 4 is a partially sectioned diagrammatic illustration of a filter sleeve upon a fuel injector case and including a detailed enlargement, according to one embodiment;

FIG. 5 is a diagrammatic illustration of a filter sleeve, according to one embodiment;

DETAILED DESCRIPTION

Figure 1:
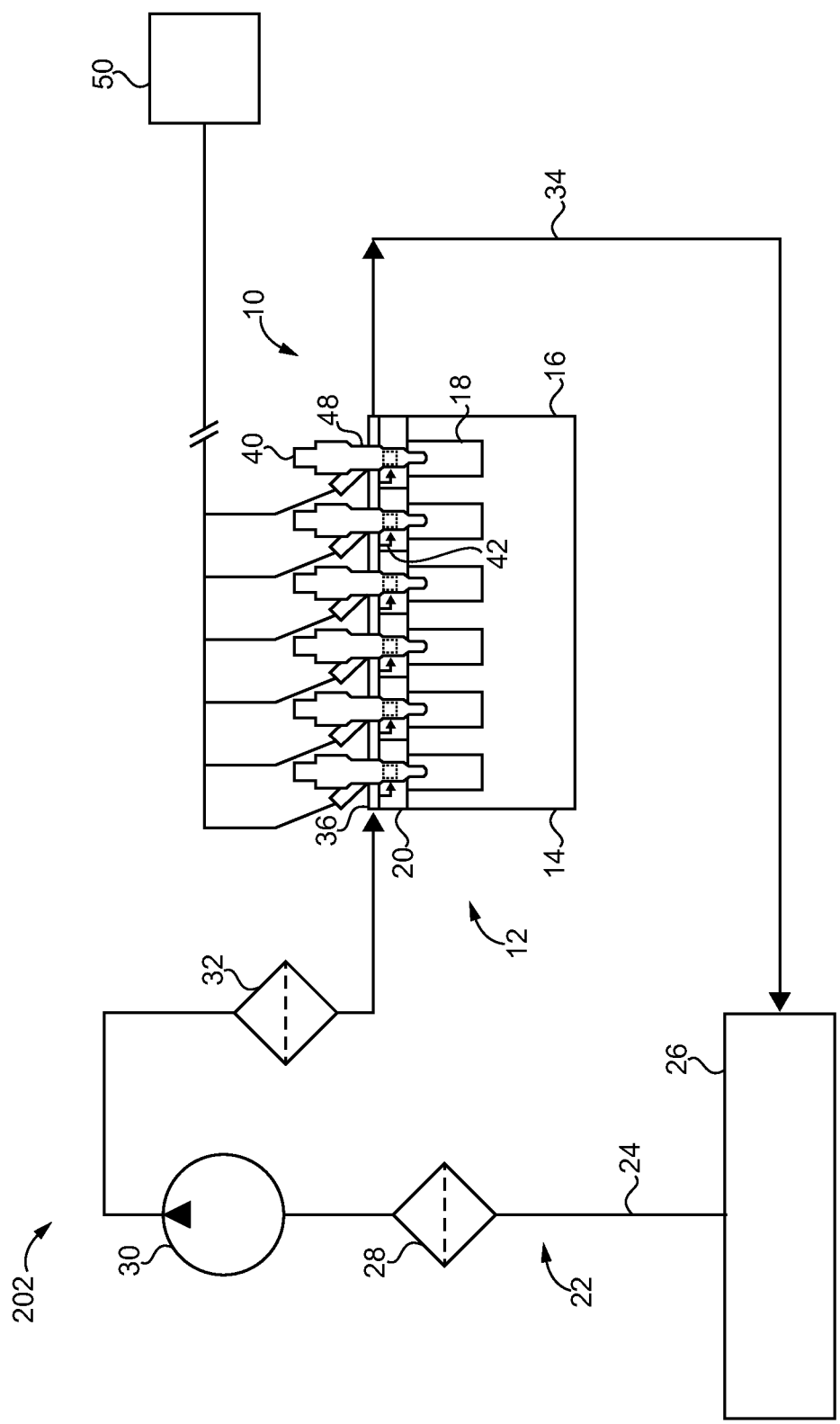
FIG. 1 is a schematic illustration of an engine head assembly in an internal combustion engine, according to one embodiment.

Referring to FIG. 1, there is shown an engine head assembly 10 for an internal combustion engine ("engine") 12 according to one embodiment. Engine 12 includes an engine housing 14, which includes an engine block 16 defining a plurality of cylinders 18, and an engine head 20. Engine head 20 should be understood to include various and typical valves, air and exhaust conduits, gaskets, seals, and other apparatus of an internal combustion engine. A plurality of pistons (not pictured) are positioned to reciprocate within cylinders 18 in a generally conventional manner. Cylinders 18 may be in-line, include two cylinder banks in a V-configuration, or any other suitable architecture. Engine head assembly 10 includes fueling components such as a fluid conduit 22 that includes an intake line 24 extending from a fuel tank 26 to a first filter 28, a pump 30, and a second filter 32, structured to convey a supply of filtered fuel to engine 12. Some segments of fluid conduit 22 may also be at least partially formed within engine head 20 as will be discussed hereinafter. A drain line 34 drains fuel from engine 12. A fuel passage 36 is positioned fluidly between intake line 24 and drain line 34 and can extend through or along engine head 20 in a generally known manner.

Figure 8:
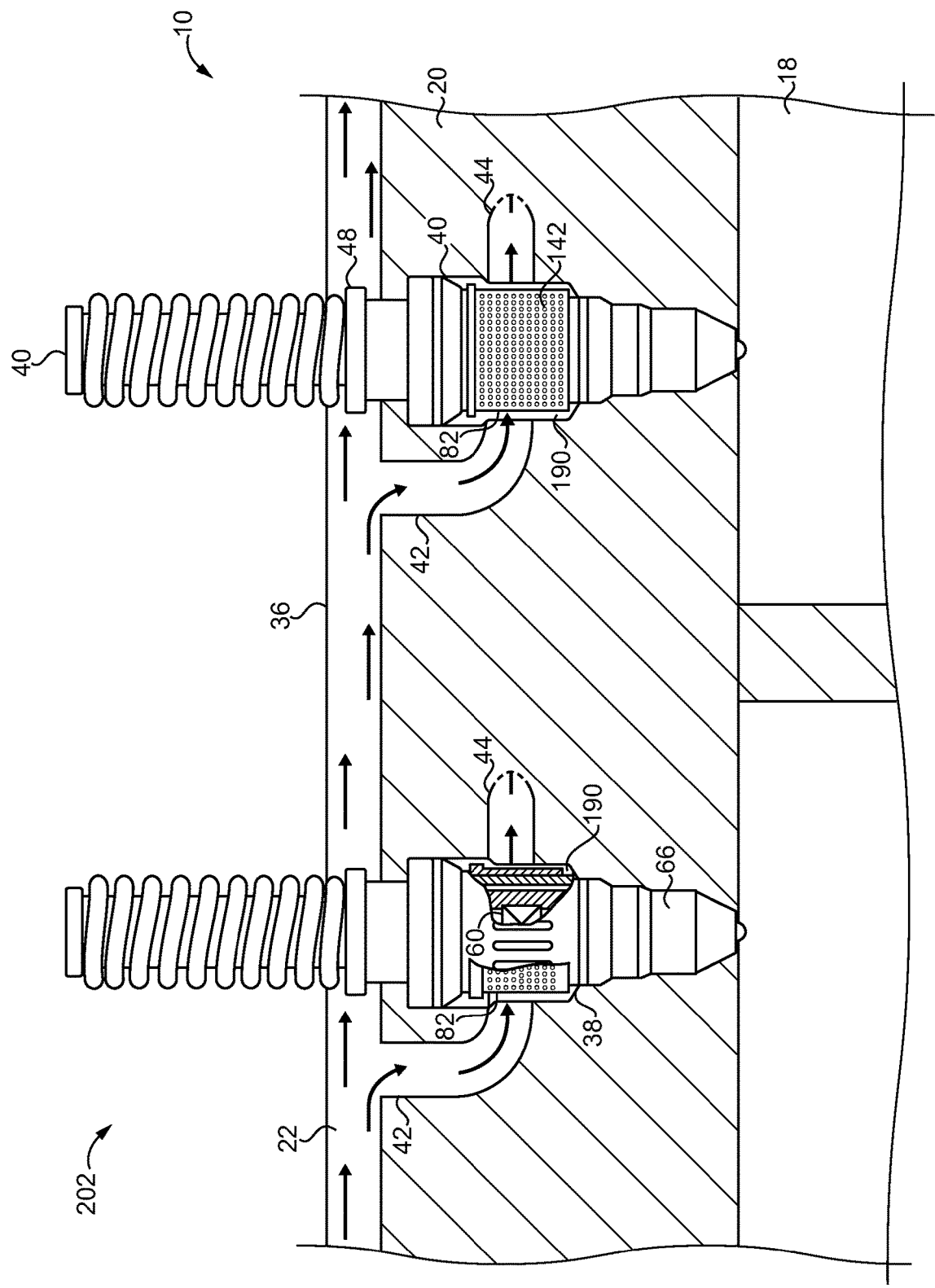
FIG. 8 is a diagrammatic illustration of fuel injectors installed in an engine head, according to one embodiment.

Engine head 20 may include a plurality of fuel injector bores 38 (as illustrated in FIG. 8, discussed hereinafter), and a plurality of fuel injector assemblies 40, each fuel injector assembly 40 being disposed in one of the fuel injector bores 38 such that the corresponding fuel injector assembly 40 extends into or is in fluid communication with the corresponding cylinder 18. Engine head assembly 10 is structured to provide a cooling fluid, such as fuel, to fuel injector assemblies 40 via fluid conduit 22. In other embodiments, a different cooling fluid, such as engine lubricating oil, engine coolant, or still others, may be used. Such embodiments may include different and/or additional structures than those shown. For example, such an embodiment may include a second fluid conduit separate from fluid conduit 22, with each being structured to supply one of fuel or the other cooling fluid to fuel injector assemblies 40. It will be appreciated that references to fuel hereinafter may be understood to apply to or describe not only fuel but also non-fuel cooling fluids. Fluid conduit 22 may further include a plurality of injector inlet lines 42 and a plurality of injector drain lines 44 (as illustrated in FIG. 8, discussed hereinafter), all of which may be at least partially formed within engine head 20. Each injector inlet line 42 and injector drain line 44 can fluidly couple one fuel injector bore 38 with common fuel passage 36 and drain line 34, respectively, for supplying fuel to or draining fuel from fuel injector assemblies 40.

Figure 2:
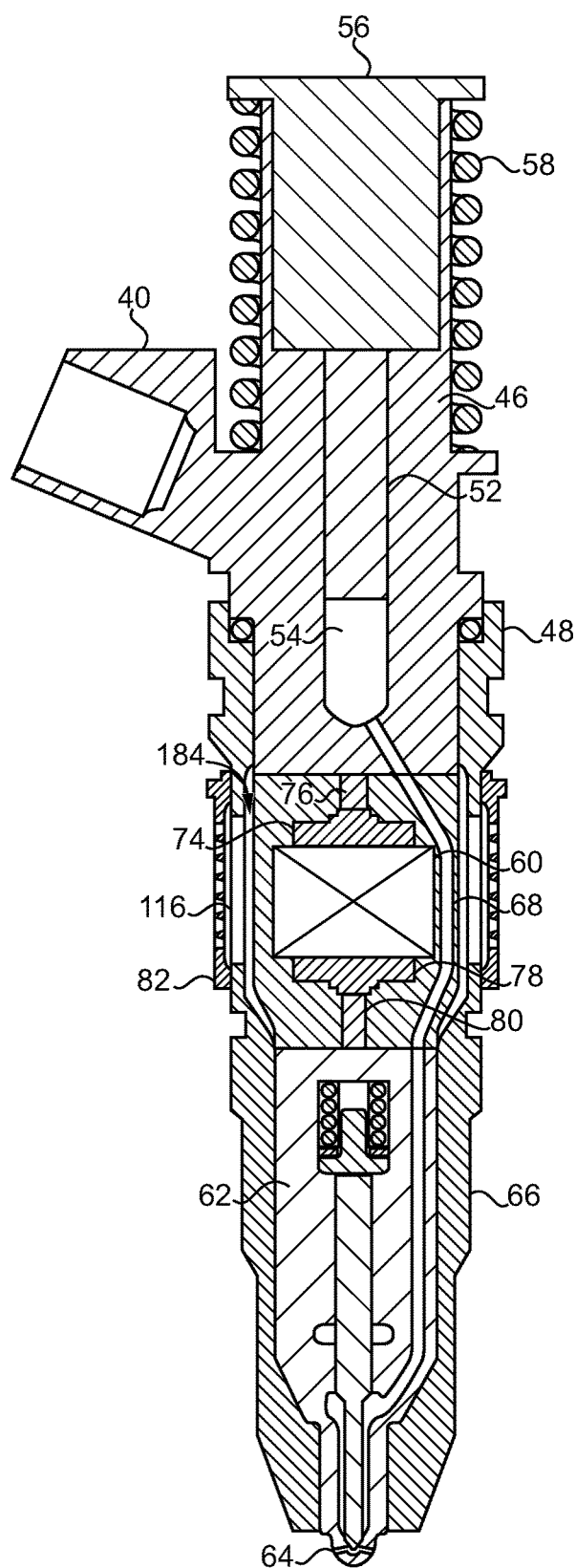
FIG. 2 is a diagrammatic illustration of a fuel injector assembly with a filter sleeve, according to one embodiment.

Each fuel injector assembly 40 may include a fuel pressurization mechanism 46 (as illustrated in FIG. 2, discussed hereinafter), and a mechanically actuated electronic unit injector ("fuel injector") 48 coupled with an electronic control module (ECM) 50. As will be apparent from the discussion herein, fuel within common fuel passage 36 can be supplied to fuel injector assemblies 40 both for cooling components of fuel injector 48 and for injecting into cylinders 18. Fluid conduit 22 might be a low-pressure fuel line for supplying low-pressure fuel to fuel injector assemblies 40 where the fuel can be pressurized by fuel pressurization mechanism 46, although embodiments in which engine head assembly 10 additionally and/or alternatively includes a high-pressure fuel conduit, such as a common rail, a high pressure pump, and other equipment are also contemplated.

Referring now also to FIG. 2, a sectioned diagrammatic view of an exemplary one of the plurality of fuel injector assemblies 40 is shown. Each of the plurality of fuel injector assemblies 40 of the present embodiment may be substantially identical to one another, and therefore the description of fuel injector assembly 40 and the illustration in FIG. 2 should be understood to refer analogously to any of the plurality of fuel injector assemblies 40 in engine head assembly 10. Fuel pressurization mechanism 46 includes a movable plunger 52, a pressure chamber 54 for receiving and pressurizing fuel, and a tappet 56. Tappet 56 is in contact with one of a plurality of cams (not pictured) upon a camshaft (not pictured) rotatable by operation of engine 12 in a generally conventional manner. In this way plunger 52, tappet 56, and a return spring 58 may move in an upward and a downward direction in the orientation of FIG. 2 in response to a rotating action of the cam and the associated camshaft to pressurize fuel in pressure chamber 54. Some embodiments of fuel injector assembly 40 may include different and/or additional components, such as a high-pressure accumulator coupled with one or more of fuel injector assemblies 40 to store a volume of pressurized fuel. In other embodiments, engine head assembly 10 may include a variety of different fuel injectors. For example, such an embodiment may include a fuel injector without fuel pressurization mechanism 46, and may also include a common rail or similar high-pressure fuel conduit for delivering pressurized fuel to one or more of the fuel injectors positioned within engine head 20.

Each fuel injector 48 includes an electrically actuated valve assembly 60, a nozzle piece 62 defining a nozzle outlet 64, typically a plurality of nozzle outlets, and a fuel injector case 66 or injector body, terms used interchangeably herein. Valve assembly 60, nozzle piece 62, and other fuel injector components may be received within fuel injector case 66 to form a valve stack (not numbered) within fuel injector 48. An internal fuel passage 68 fluidly connects pressure chamber 54 with nozzle outlet 64. Fuel injector 48 may also include additional internal fuel passages, such as a fuel passage (not shown) supplying plunger 52, for example. Pressure chamber 54 can be selectively connected with fluid conduit 22 through operation of valve assembly 60 in a generally conventional manner such that an intake stroke of plunger 52 can draw in fuel and a pressurization stroke can deliver pressurized fuel to internal fuel passage 68 for injection. It will be appreciated that valve assembly 60 is shown diagrammatically in FIG. 2.

Figure 3:
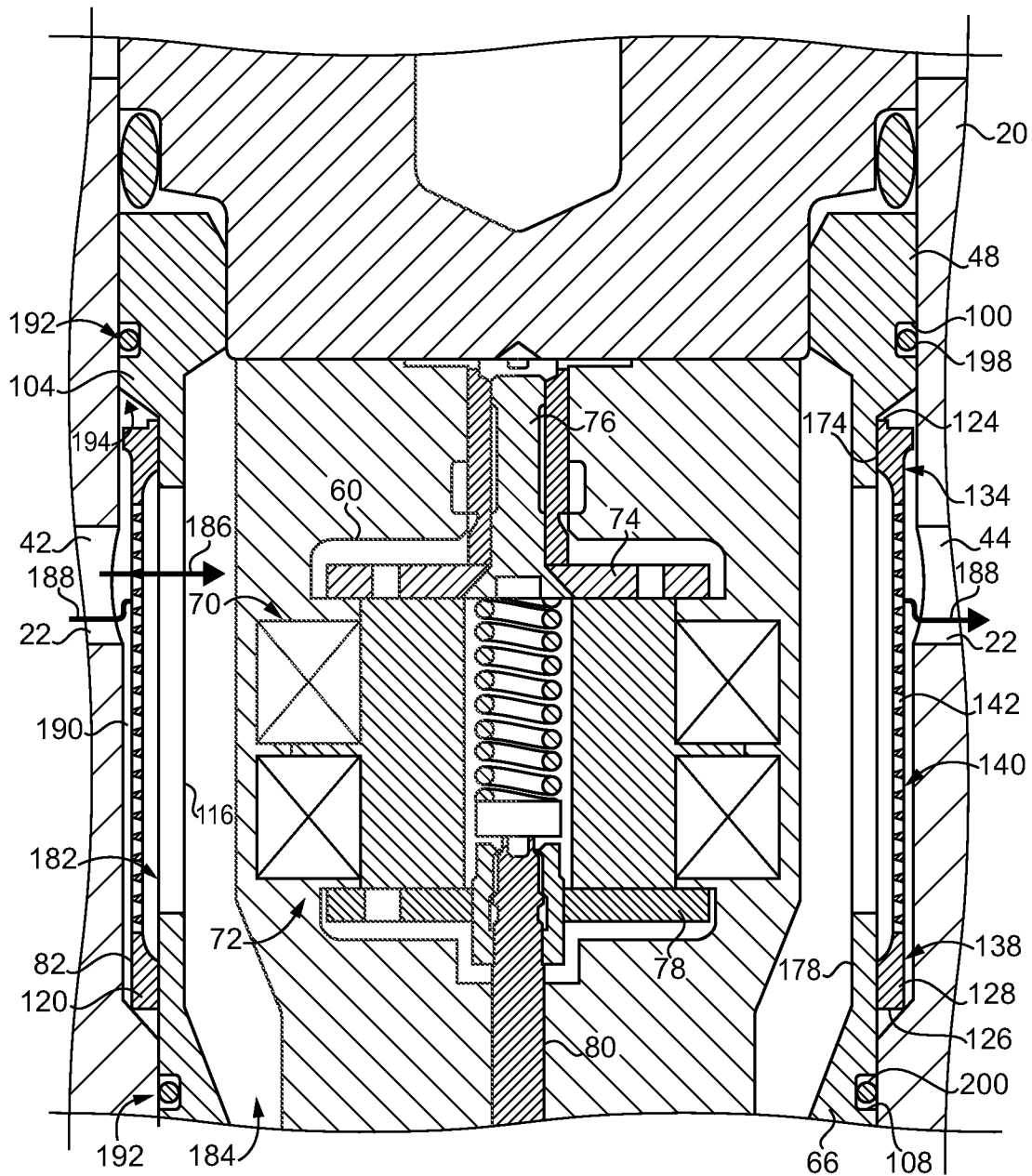
FIG. 3 is a diagrammatic illustration of a fuel injector assembly with a filter sleeve positioned in an engine head, according to one embodiment.

Referring now also to FIG. 3, valve assembly 60 includes a first electrical actuator 70 and a second electrical actuator 72, both of which may include a solenoid. First electrical actuator 70 includes a first armature 74 that is movable in response to a change to an energy state of first electrical actuator 70 for controlling movement of a first valve 76, which may be a spill valve, for instance. Second electrical actuator 72 includes a second armature 78 that is movable in response to a change to an energy state of second electrical actuator 72 for controlling movement of a second valve 80, which, for example, may be an injection control valve. The design and operation of valve assembly 60 can be generally of known strategy, and it should be understood that the precise positioning of internal fuel passage 68 and certain other components of fuel injector assembly 40 could be modified from the illustrated embodiments without departing from the scope of the present disclosure.

Referring now also to FIG. 4, a diagrammatic view of fuel injector case 66 having a filter sleeve 82 fitted thereon is shown with filter sleeve 82 being partially sectioned. Fuel injector case 66 has an elongate body 84 defining a longitudinal axis 86, elongate body 84 including a first axial end 88 and a second axial end 90. Elongate body 84 also includes a cylindrical wall 92 extending axially between first axial end 88 and second axial end 90. Further, elongate body 84 includes a first end segment 94 that includes first axial end 88, a second end segment 96 that includes second axial end 90, and a fuel supply segment 98 positioned axially between first end segment 94 and second end segment 96, fuel supply segment 98 having an axial length. Second end segment 96 includes a nozzle end segment (hereinafter "nozzle end segment 96") having nozzle piece 62 therein. Nozzle end segment 96 may narrow in a direction of second axial end 90 approximately as shown. On one axial side of fuel supply segment 98, fuel injector case 66 may include a first annular groove 100 extending around elongate body 84 at a first location 102 within first end segment 94, and an annular shoulder 104 extending around elongate body 84 at a second location 106 axially between fuel supply segment 98 and first axial end 88. On another axial side of fuel supply segment 98, fuel injector case 66 may further include a second annular groove 108 extending around elongate body 84 at a third location 110 axially between fuel supply segment 98 and second axial end 90. Elongate body 84 includes an outer peripheral surface, including a first outer peripheral surface 112 adjacent to annular shoulder 104 within first end segment 94, and a second outer peripheral surface 114 adjacent to annular shoulder 104 within fuel supply segment 98, with first outer peripheral surface 112 having a greater radial extent than second outer peripheral surface 114 such that annular shoulder 104 forms an overhang over fuel supply segment 98 in the orientation of FIGS. 1-4. In other words, a radial extent of filter sleeve 82 upon fuel injector case 66 is less than or equal to a radial extent of annular shoulder 104.

Elongate body 84 includes a plurality of fuel openings 116 in fuel supply segment 98 that extend through cylindrical wall 92 to permit entry of fuel into fuel injector 48 through fuel injector case 66. Fuel openings 116 might be axially-oriented slots spaced circumferentially on elongate body 84 around longitudinal axis 86, with each having an axial length that is less than or equal the axial length of a filtration segment 140 of filter sleeve 82. Fuel openings 116 could have any other orientation relative to longitudinal axis 86 or could have varying sizes within elongate body 84. In some embodiments, fuel openings 116 could have a different shape or could be distributed differently within elongate body 84. For instance, fuel openings 116 could be substantially circular or polygonal perforations that are distributed axially and circumferentially uniformly within fuel supply segment 98, or that are clustered or grouped to potentially direct a flow of fuel into or out of fuel injector case 66.

Filter sleeve 82 is positioned upon fuel injector case 66 within fuel supply segment 98 and filter sleeve 82 is retained by way of an interference fit connection attaching filter sleeve 82 to fuel injector case 66. Referring now also to FIG. 5, a perspective view of filter sleeve 82 is shown without fuel injector case 66. Filter sleeve 82 includes a unitary body 120 defining a longitudinal axis 122, with unitary body 120 having a first axial end 124 and a second axial end 126, and a cylindrical wall 128 extending axially between first axial end 124 and second axial end 126. When filter sleeve 82 is positioned upon fuel injector case 66, filter sleeve 82 and fuel injector case 66 are co-axial in that longitudinal axis 86 coincides with longitudinal axis 122. An inner peripheral surface 130 and an outer peripheral surface 132 of cylindrical wall 128 are also located on unitary body 120, with inner peripheral surface 130 structured for positioning about elongate body 84 within fuel supply segment 98. When thusly positioned, outer peripheral surface 132 is radially inward of first outer peripheral surface 112. Unitary body 120 further includes a first end segment 134 that includes first axial end 124 and an outwardly projecting lip 136 extending circumferentially around unitary body 120 within first end segment 134, a second end segment 138 that includes second axial end 126, with filtration segment 140 being positioned axially between first end segment 134 and second end segment 138. Unitary body 120 is integrally formed and has a substantially uniform material composition. A cross section of unitary body 120 may be seen to have a uniform crystalline microstructure under magnification. Put differently, unitary body 120 is not typically formed by welding, bonding, sintering, or otherwise melding or combining discrete components, even if the components have similar or identical material compositions. Instead, unitary body 120 may be formed from a single blank or the like, as further discussed herein.

Referring still to FIGS. 1-5 generally, but to FIGS. 4 and 5 in particular, it can be seen that unitary body 120 is perforated within filtration segment 140, forming a particle-blocking perforation array ("perforation array") 142. Perforation array 142 has a circumferential distribution of perforations and an axial distribution of perforations within filtration segment 140. At least a portion of perforation array 142 has a perforation density of about 75 perforations per $mm^2$ or greater. In some embodiments, the perforation density may be substantially uniform throughout filtration segment 140, while other embodiments may have regions that include a relatively higher or relatively lower perforation density than other regions. Perforation array 142 may include at least 100,000 perforations within filtration segment 140. Filter sleeve 82 of the present embodiment, for example, includes at least 150,000 perforations within filtration segment 140, which might be the number of perforations necessary to achieve a target total flow area of about 430 $mm^2$. In other embodiments, the number, extent, distribution, density, or arrangement of perforations within perforation array 142 may vary depending on any number of considerations, such as the size and arrangement of the perforations, the size of the corresponding nozzle outlet 64, the type of fuel or cooling fluid utilized, a target total flow area, or the operating conditions to which fuel injector 48, fuel injector case 66, or filter sleeve 82 are subjected. In some other embodiments, the number of perforations may be limited only by a dimensional or physical property of filter sleeve 82 such as the surface area of filtration segment 140 or the structural integrity of unitary body 120. Put differently, in some instances, unitary body 120 might be perforated until there is no more room for more perforations within filtration segment 140, or until adding more perforations might be considered to unduly affect structural integrity of filter sleeve 82.

Perforation array 142 has a three-dimensional footprint within unitary body 120, which might be different than a three-dimensional footprint of filtration segment 140. In other words, perforation array 142 may have an axial or a circumferential extent that is different than an axial or circumferential extent of filtration segment 140, though each dimension of the three-dimensional footprint of perforation array 142 will be equal to or less than a corresponding dimension of the three-dimensional footprint of filtration segment 140. The three-dimensional footprint of perforation array 142 may have an axial length that is at least a majority of an axial length of filtration segment 140, and may have a circumference that is at least a majority of a circumference of unitary body 120 within filtration segment 140. A "majority" should be understood to be from about 51% to 100% such that a "majority" includes an "entirety." The three-dimensional footprint of perforation array 142 of the present embodiment, for instance, is substantially congruent to and coextensive with the three-dimensional footprint of filtration segment 140. As can be seen in FIGS. 4 and 5, both the circumferential distribution of perforations and the axial distribution of perforations in perforation array 142 may be substantially uniform, although other distributions of perforations within perforation array 142 are also contemplated. For example, perforation array 142 might have a band-like distribution of perforations within filtration segment 140, where perforation array 142 is formed in multiple bands of perforations distributed circumferentially around unitary body 120, and that are axially interspersed with non-perforated regions of filtration segment 140 that also extend circumferentially around unitary body 120. Embodiments in which perforation bands extend only partially around the circumference of unitary body 120 are also contemplated. A similar arrangement may include a series of axially extending perforation columns circumferentially interspersed with non-perforated regions. Still other embodiments could include concentrated distributions of perforations in certain regions of filtration segment 140 that correspond with regions at which filter sleeve 82 is in facing relation to fluid conduit 22 when positioned in engine head assembly 10, as discussed further herein. In still other embodiments, perforations within perforation array 142 may have a different pattern within filtration segment 140, such as a checkered pattern, a cross-hatched pattern, or any other desired pattern or arrangement consistent with the present disclosure.

FIG. 4 also includes a detailed enlargement of cylindrical wall 128 within filtration segment 140 and first end segment 134 illustrating, amongst other things, an exemplary formation of the perforations through unitary body 120. Laser drilling technology may be used to perforate unitary body 120, and can be executed such that each perforation within perforation array 142 is substantially identical in size and shape, and is substantially free of non-uniformities such as burrs, for instance. In other embodiments, perforations may have different shapes or sizes in different regions of filtration segment 140 than in others. Each perforation in perforation array 142 includes an inner opening 144 formed in inner peripheral surface 130, and an outer opening 146 formed in outer peripheral surface 132. Typically, both inner opening 144 and outer opening 146 are substantially circular, with each perforation being substantially conically shaped in that a diameter 148 of each inner opening 144 is less than a diameter 150 of the corresponding outer opening 146. Diameter 148 may be understood to be a maximum width of inner opening 144, and diameter 150 may be understood to be a maximum width of outer opening 146. Accordingly, an area of each outer opening 146 is typically greater than an area of the corresponding inner opening 144. In other embodiments, each perforation, or one or both of inner opening 144 and outer opening 146, may have a different shape, however. Each diameter 150 within perforation array 142 may be substantially uniform, and might be dimensionally structured relative to a diameter of nozzle outlet 64 such that perforation array 142 can block particles having a dimension greater than the diameter of nozzle outlet 64. For example, where nozzle outlet 64 has a diameter greater than 100 μm, each diameter 150 may be about 100 μm or less, wherein 1 μm is equal to 0.001 mm. In some contexts, however, it may be desirable to limit diameters 150 to about 75% or less than the diameter of nozzle outlet 64. In this context if, for instance, the diameter of nozzle outlet 64 is 100 μm, then diameter 150 of a majority of the perforations in perforation array 142 might be from about 55 μm to about 65 μm. As used herein, the term "about" can be understood in the context of conventional rounding to a consistent number of significant digits. Accordingly, "about 100 μm" can be understood to mean from 51 μm to 149 μm, "about 1.5 mm" can be understood to mean from 1.45 mm to 1.54 mm, and so on.

Each perforation within perforation array 142 extends through cylindrical wall 128 from inner peripheral surface 130 to outer peripheral surface 132. Unlike within filtration segment 140, where unitary body 120 is perforated, each of first end segment 134 and second end segment 138 is continuous in circumferential extent and axial extent such that unitary body 120 is unperforated, allowing each to form a seal with elongate body 84, as discussed hereinafter. The subject seal(s) can be fluid-tight, and will typically be at least sufficiently tight to block particles of about 50 μm, even if some fluid leakage can occur. As illustrated in the detailed enlargement of FIG. 4, cylindrical wall 128 can have a non-uniform wall thickness from inner peripheral surface 130 to outer peripheral surface 132, which results in a fluid space 182 being formed between filter sleeve 82 and fuel injector case 66. The desired wall thickness of cylindrical wall 128 may vary—even within unitary body 120—based on a number of different operating parameters or other considerations, such as, a desired flow area, a desired diameter 150, a desired pressure gradient between fluid conduit 22 and a fluid space within fuel injector 48, or a desired number of perforations within perforation array 142. For instance, cylindrical wall 128 may have a first wall thickness 152 within filtration segment 140 and a second wall thickness 154 within first end and second end segments 134, 138, with first wall thickness 152 being less than second wall thickness 154. First wall thickness 152 may be about 0.5 mm or less and, more particularly, about 0.25 mm, although first wall thickness 152 could also be greater than 0.5 mm in some embodiments. Additionally, as can be seen in FIG. 4, cylindrical wall 128 may have a third wall thickness 156 at lip 136 within first end segment 134, wherein third wall thickness 156 is greater than second wall thickness 154. It will be appreciated that each of wall thicknesses 152, 154, 156 are relative measurements and thus each may include a range of values. For example, second wall thickness 154 includes the wall thickness within both first end segment 134 and second end segment 138. While, typically, the wall thickness of cylindrical wall 128 within both first end segment 134 and second end segment 138 will be identical or at least substantially similar, each may be different in certain embodiments. In such embodiments, second wall thickness 154 could include a range of wall thicknesses encompassing the wall thickness of cylindrical wall 128 within both first and second segments 134, 138. Although it will also be appreciated that, in other embodiments, cylindrical wall 128 might have more than three wall thicknesses. In other embodiments still, cylindrical wall 128 may have a uniform thickness between first axial end 124 and second axial end 126.

Figures 6, 7:
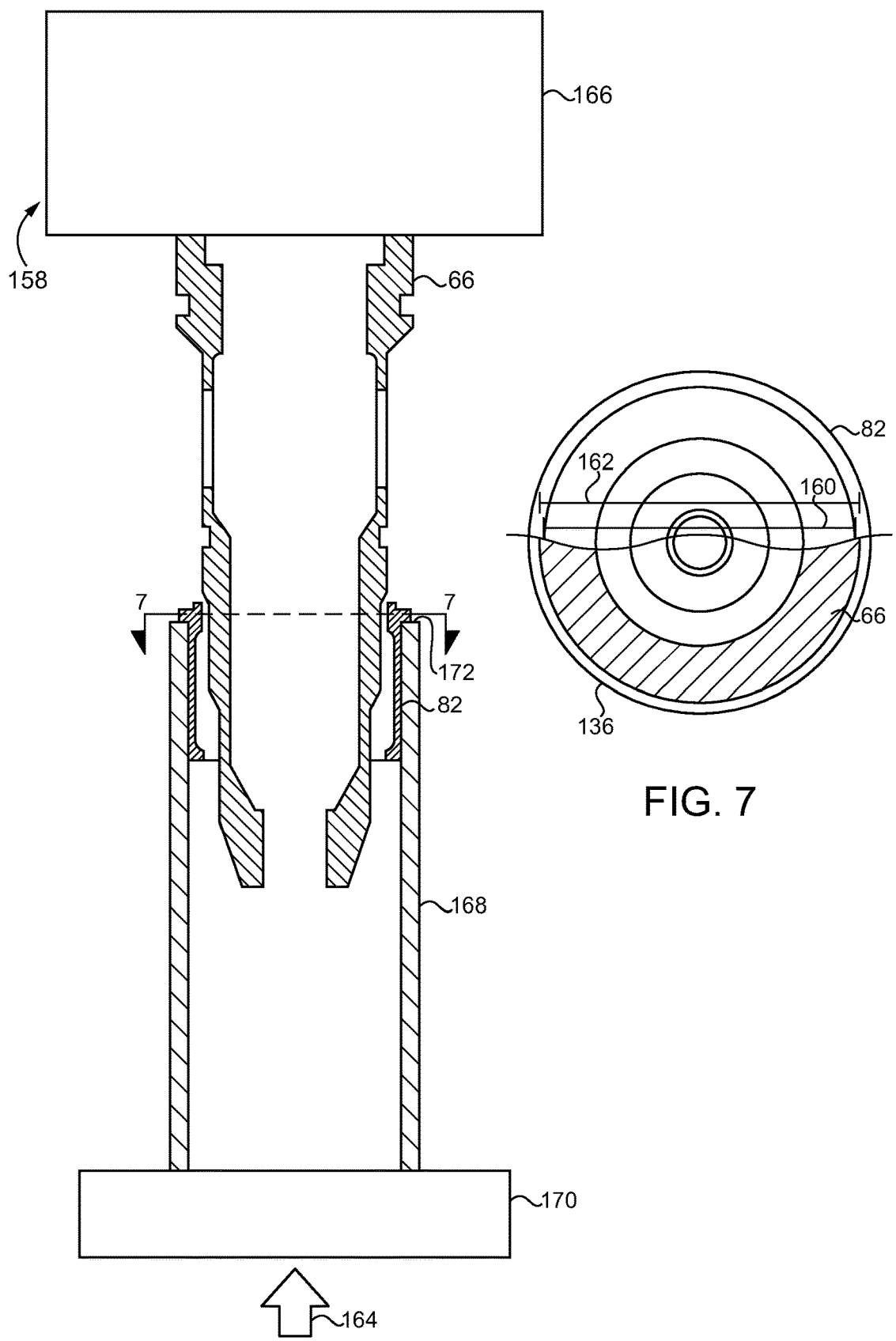
FIG. 6 is a partially sectioned diagrammatic view of a filter sleeve being fitted onto a fuel injector case, according to one embodiment.
FIG. 7 is a cross sectional view of a fuel injector case and a filter sleeve as in FIG. 6, according to one embodiment.

Referring now to FIG. 6, a sectioned view of fuel injector case 66 is seen, with fuel injector case 66 being shown positioned in a fixture or mount system 158 structured to attach filter sleeve 82 to fuel injector case 66 by way of an interference fit for purposes of setting up a fuel system 202 (as seen in FIG. 1, and in FIG. 8, discussed hereinafter). Referring briefly now also to FIG. 7, it can be seen that a minimum diameter 160 of inner peripheral surface 130 may be slightly less than a maximum diameter 162 of second outer peripheral surface 114. In other words, diameter 160 interferes with diameter 162 such that fitting filter sleeve 82 on to fuel injector case 66 allows filter sleeve 82 to be retained thereon, within fuel supply segment 98, by way of an interference fit, which in the illustrated case includes a press fit. As such, application of an axial force 164 to filter sleeve 82 might be necessary or desirable to fit filter sleeve 82 on fuel supply segment 98. Returning again to FIG. 6, machine 158 may include a first block 166, a sleeve 168, and a second block 170. Sleeve 168 is structured to receive filter sleeve 82 such that lip 136 rests on an upper edge 172 thereof. Sleeve 168 is coupled with second block 170, which allows application of axial force 164 to lip 136 such that filter sleeve 82 is press fit onto fuel injector case 66, which is prevented from upward movement parallel to axial force 164 by first block 166.

Setting up fuel system 202 further includes establishing fluid communication between perforations in perforation array 142 and fuel openings 116 by way of positioning and interference fitting filter sleeve 82 upon fuel injector case 66. Referring now again to FIGS. 1-5 generally, but FIGS. 2-4 particularly, it can be seen that interference fitting filter sleeve 82 on fuel injector case 66 may form a first interference fit connection 174 within first end segment 134, and a second interference fit connection 178 within second end segment 138. In other embodiments, interference fitting filter sleeve 82 on fuel injector case 66 may result in more or less interference fit connections, however. First interference fit connection 174 might be formed at an interface between inner peripheral surface 130 at first end segment 134, and fuel supply segment 98 between fuel openings 116 and annular shoulder 104. Further, second interference fit connection 178 might be formed at an interface between inner peripheral surface 130 at second end segment 138, and fuel supply segment 98 between fuel openings 116 and second annular groove 108. As unitary body 120 within first end segment 134 and second end segment 138 has a continuous extent, first interference fit connection 174 and second interference fit connection 178 may form fluid seals between filter sleeve 82 and fuel injector case 66, and may result in formation of fluid space 182, as mentioned above. Additionally, fuel injector components such as nozzle piece 62 and valve assembly 60 are positioned within fuel injector case 66 so as to form a second fluid space 184 within fuel injector case 66, wherein fluid space 182 includes a first fluid space 182 (hereinafter "first fluid space 182"). Each of first fluid space 182 and second fluid space 184 may be annular and extend circumferentially around fuel injector case 66 and valve assembly 60, respectively, each being capable of receiving fuel from fluid conduit 22. In other embodiments, fluid spaces 182, 184 may have a different shape depending on the shape, configuration, or position of filter sleeve 82, fuel injector case 66, or the components of fuel injector 48, such as valve assembly 60.

Nozzle piece 62 and valve assembly 60 are housed in fuel injector case 66, as can be seen in FIG. 2, for instance, with nozzle piece 62 at least partially positioned within nozzle end segment 96, and valve assembly 60 at least partially positioned within fuel supply segment 98. Further, it can be seen that filter sleeve 82 is positioned upon fuel injector case 66 such that at least a portion of valve assembly 60, including actuators 70, 72, is positioned axially between first end segment 94 and nozzle end segment 96. In this way, filtration segment 140, fuel supply segment 98, and valve assembly 60 are generally in axial alignment. Perforation array 142 and fuel openings 116 may therefore form a fluid flow path 186 through filter sleeve 82 and fuel injector case 66, respectively, that permits the fuel to enter fuel injector 48 for delivery to valve assembly 60. Valve assembly 60 is within fluid flow path 186, which allows fuel to be delivered to or near at least one of electrical actuators 70, 72 for cooling. As will be appreciated by those skilled in the art, some fuel flowing into an injector cooling segment 190 of fluid conduit 22, which extends around filter sleeve 82, may flow around and past filter sleeve 82 to a downstream segment of fluid conduit 22. Some fuel may flow through perforation array 142, and in a fluid flow path 188, past filter sleeve 82 to the downstream segment of fluid conduit 22.

Setting up fuel system 202 in engine 12 also includes installing fuel injector 48 in engine housing 14 such that perforation array 142 is positioned to filter fuel flowing between fuel conduit 22 and valve assembly 60, which is positioned within fuel injector case 66. Referring now also to FIG. 8, a diagrammatic view of engine head 20 is shown to illustrate the relative positioning of fuel injector assemblies 40 and fluid conduit 22. Each fuel injector assembly 40 may be positioned in one of the plurality of fuel injector bores 38, with each fuel injector assembly 40 being in fluid communication with common fuel passage 36. In some embodiments, engine head assembly 10 might not include common fuel passage 36. Fluid conduit 22 could instead be partially formed within engine head 20 such that each fuel injector assembly 40 is positioned in fluid series in that the fuel may flow through fluid conduit 22 to a first one of the plurality of fuel injector assemblies 40, and from the first one to a second one of the plurality of fuel injector assemblies 40, and so on.

As can be seen in FIG. 3, fluid flow path 186 and fluid flow path 188 are illustrated via an incoming arrow also identified with reference numeral 186 showing a flow of fuel into unitary body 120, and via an outgoing arrow also identified with reference numeral 188 showing a flow of fuel around unitary body 120, respectively. A first fluid seal 192 and a second fluid seal 194 may be positioned axially above perforation array 142 in the orientation of FIG. 4, and a third fluid seal 196 may be axially below perforation array 142 in the same orientation. A first annular sealing element 198, such as a rubber O-ring or the like, may be positioned in a first annular groove 100 to form first fluid seal 192 between fuel injector case 66 and engine head 20 at first location 102, and annular shoulder 104 may form second fluid seal 194 between fuel injector case 66 and engine head 20. Further, a second annular sealing element 200, which may be similar to first annular sealing element 198, may be positioned within second annular groove 108 to form third fluid seal 196, with annular shoulder 104 being positioned axially between grooves 100,108.

When positioned on fuel injector 48, filter sleeve 82 extends a majority of the axial length of fuel injector case 66 between first annular groove 100 and second annular groove 108. Injector cooling segment 190 has an axial extent spanning at least a majority of perforation array 142 and may be annular in shape such that injector cooling segment 190 extends circumferentially around fuel injector case 66 at perforation array 142.

INDUSTRIAL APPLICABILITY

Referring now to the drawings generally, during operation of engine 12, fuel is pumped through fluid conduit 22 from fuel tank 26 to common fuel passage 36, where fuel may then be conveyed to each of the plurality of fuel injector assemblies 40. Valve assembly 60 may be energized such that a metered quantity of fuel is injected into the corresponding cylinder 18 through nozzle outlet 64 in a generally conventional manner. As discussed above, high operating temperatures resulting, for instance, from frequent and repetitive energization of valve assembly 60, and from friction created between fuel injector components during use, amongst other things, may reduce the service life of fuel injector assemblies 40, or may otherwise negatively impact performance.

To cool fuel injector 48 during operation, fuel from fuel tank 26 may be delivered to fuel injectors 48. Pump 30 can pump fuel through intake line 24 to and through first filter 28 and second filter 32 to remove particles from the fuel. Fuel can then be pumped to common fuel passage 36 and supplied to each fuel injector assembly 40 via injector inlet lines 42. Fuel may be permitted to flow into injector cooling segment 190, limited by way of seals 192, 194, 196. From injector cooling segment 190, fuel may pass through unitary body 120 via perforation array 142 along fluid flow path 186 and into first annular fluid space 182, and from first annular fluid space 182 through fuel openings 116 into second annular fluid space 184. Fuel entering second annular fluid space 184 may flow circumferentially around valve assembly 60 for cooling. From second annular fluid space 184 fuel may be drawn into fuel injector 48 by operation of valve assembly 60 and plunger 52, and can be conveyed to pressure chamber 54. Fuel passed through or around fuel injector assembly 40 may then be drained from engine head 20 to fuel tank 26 by drain lines 34, 44.

Though fuel is filtered upstream of common fuel passage 36, it has been observed that servicing or replacing fuel injector assemblies 40, amongst other things, can cause dust, dirt, metal shavings, or other contaminants to be introduced to fluid conduit 22 downstream of filters 28, 32. Filters 28, 32 can also fail. Wear of parts and surfaces, or still other phenomena, can also produce particles. Without a filtering mechanism positioned fluidly between fluid conduit 22 and fuel injector case 66, contaminates in fluid conduit 22 downstream of filters 28, 32 may be drawn in to fuel injector 48 for pressurization and injection, potentially resulting in fuel injectors 48 becoming clogged, damaged, or otherwise degraded.

Traditional fuel filtration strategies to combat downstream contamination generally would involve positioning additional filters in the fluid conduit between filters 28, 32 and injector bores 38. Space limitations, structural concerns, servicing costs, or still other issues can prevent the implementation of these filtering strategies or make them inferior.

Unlike traditional filtering strategies, such as one-dimensional edge filters and others, fuel injector case 66 of the present disclosure includes filter sleeve 82 positioned thereon, with filter sleeve 82 including an integrated fuel filter in the form of perforation array 142 structured to filter particulates based on both height and width dimensions, for example. It has been discovered that laser drilling technology enables creation of a field of tiny perforations within unitary body 120 at filtration segment 140, which can block particles from entering fuel injectors 48 without having to compromise the structural integrity of filter sleeve 82 or install additional filters. Perforation array 142 is also integral with unitary body 120, which can cost effectively provide filter sleeve 82 with a degree of structural rigidity and uniformity not possible with multi-component or multi-material filters. The integral formation of unitary body 120 also allows wall thicknesses 152, 154, 156 to be such that filter sleeve 82, when fitted upon elongate body 84 at fuel supply segment 98, does not project radially outward to a greater extent than annular shoulder 104, which allows fuel injector 48 with filter sleeve 82 to be received by fuel injector bore 38 without modification. Those skilled in the art will recognize the desirability of filtering solutions that avoid having to retrofit engine head 20 and/or reengineer fuel injector case 66. For instance, fuel injector assembly 40 may be installed in existing engines without having to modify engine head 20, and may reduce service costs and downtime by allowing the filter sleeve 82 to be changed contemporaneously with swapping out fuel injector assembly 40.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. It will be appreciated that certain features and/or properties of the present disclosure, such as relative dimensions or angles, may not be shown to scale. As noted above, the teachings set forth herein are applicable to a variety of different devices, assemblies, and systems having a variety of different structures than those specifically described herein. Other aspects, features and advantages will be apparent upon an examination of the attached drawings and appended claims. As used herein, the articles "a" and "an" are intended to include one or more items, and may be used interchangeably with "at least one." Where only one item is intended, the term "one" or similar language is used. Also, as used herein, the terms "has," "have," "having," or the like are intended to be open-ended terms.

What is claimed is:

1. A filter sleeve for a fuel injector comprising:
a unitary body defining a longitudinal axis and including a first axial end, a second axial end, and an inner peripheral surface structured for positioning about a fuel injector body having a fuel opening formed therein;
the unitary body further including a first end segment that includes the first axial end, a second end segment that includes the second axial end, and a filtration segment positioned axially between the first end segment and the second end segment; and
the filtration segment having a particle-blocking perforation array with a circumferential distribution of perforations and an axial distribution of perforations in the unitary body, and each of the first end segment and the second end segment being continuous such that the unitary body is unperforated within the first end segment and the second end segment for forming seals with the fuel injector body.

2. The filter sleeve of claim 1 wherein the first end segment further includes an outwardly projecting lip extending circumferentially around the unitary body.

3. The filter sleeve of claim 1 wherein the unitary body has a wall thickness of about 0.5 mm or less within the filtration segment.

4. The filter sleeve of claim 3 wherein the unitary body has a wall thickness of about 0.25 mm within the filtration segment.

5. The filter sleeve of claim 3 wherein:
the unitary body has a first wall thickness within the filtration segment and a second wall thickness within the first end segment and the second end segment, the first wall thickness being less than the second wall thickness; and
the unitary body has a third wall thickness within the first end segment that is formed in part by an outwardly projecting lip extending circumferentially around the unitary body, the third wall thickness being greater than the second wall thickness.

6. The filter sleeve of claim 3 wherein each perforation in the particle-blocking perforation array has an inner opening and an outer opening, and the inner opening of a majority of the perforations in the particle-blocking perforation array having a diameter from about 55 µm to about 65 µm.

7. The filter sleeve of claim 3 wherein the particle-blocking perforation array has a three-dimensional footprint with an axial length that is at least a majority of an axial length of the filtration segment and a circumference that is at least a majority of a circumference of the unitary body within the filtration segment.

8. The filter sleeve of claim 3 wherein the unitary body has a substantially uniform material composition.

9. A fuel injector comprising:
an electrically actuated valve assembly;
a nozzle piece defining a nozzle outlet;
a fuel injector case coupled with the nozzle piece, the fuel injector case having the electrically actuated valve assembly positioned at least partially therein, and including a fuel supply segment having a fuel opening formed therein and extending through the fuel injector case;
a filter sleeve including a unitary body defining a longitudinal axis, the unitary body having a first end segment that includes a first axial end of the unitary body, a second end segment that includes a second axial end of the unitary body, and a filtration segment;
the filtration segment positioned axially between the first end segment and the second end segment, and the filter sleeve being positioned upon the fuel injector case within the fuel supply segment such that at least a portion of the electrically actuated valve assembly is positioned axially between the first end segment and the second end segment; and
the filtration segment including a particle-blocking perforation array having a circumferential distribution of perforations and an axial distribution of perforations in the unitary body, and each of the first end segment and the second end segment being continuous such that the unitary body is unperforated within the first end segment and the second end segment and forms a seal with the fuel injector body.

10. The fuel injector of claim 9 wherein the fuel opening is a slot.

11. The fuel injector of claim 10 wherein an axial length of the slot is equal to or less than an axial length of the filtration segment.

12. The fuel injector of claim 9 wherein the filter sleeve is retained upon the fuel injector case by way of an interference fit.

13. The fuel injector of claim 12 wherein the interference fit includes a first interference fit connection of the first end segment, and a second interference fit connection of the second end segment.

14. A fuel injector comprising:
an electrically actuated valve assembly;
a nozzle piece defining a nozzle outlet;
a fuel injector case coupled with the nozzle piece, the fuel injector case having the electrically actuated valve assembly positioned at least partially therein, and including a fuel supply segment having a fuel opening formed therein and extending through the fuel injector case;
a filter sleeve including a unitary body defining a longitudinal axis, the unitary body having a first end segment that includes a first axial end of the unitary body, a second end segment that includes a second axial end of the unitary body, and a filtration segment;
the filtration segment positioned axially between the first end segment and the second end segment, and the filter sleeve being positioned upon the fuel injector case within the fuel supply segment such that at least a portion of the electrically actuated valve assembly is positioned axially between the first end segment and the second end segment; and
the filtration segment including a particle-blocking perforation array having a circumferential distribution of perforations and an axial distribution of perforations in the unitary body, and
wherein the fuel injector case further includes a first annular groove positioned on one axial side of the fuel supply segment, and a second annular groove positioned on another axial side of the fuel supply segment, and wherein the sleeve extends a majority of an axial length of the fuel injector case between the first annular groove and the second annular groove.

15. The fuel injector of claim 14 wherein the fuel injector case further includes an annular shoulder positioned axially between the first groove and the second groove, and a radial extent of the filter sleeve is equal to or less than a radial extent of the annular shoulder.

16. The fuel injector of claim 9 wherein the sleeve further includes a radially projecting lip within the first end segment.

17. The fuel injector of claim 9 wherein the filter sleeve has a wall thickness of about 0.5 mm or less within the filtration segment.

18. The fuel injector of claim 9 wherein an annular fluid space is formed between the filter sleeve and the fuel injector case.

19. The fuel injector of claim 9 wherein each perforation in the particle-blocking perforation array has an inner opening and an outer opening, and the inner opening of a majority of the perforations in the particle-blocking perforation array has a diameter about 75% or less than a diameter of the nozzle outlet.

20. A method of setting up a fuel system for an engine comprising:
positioning a filter sleeve having a unitary body upon a fuel injector case;

attaching the filter sleeve to the fuel injector case by way of an interference fit connection;

establishing fluid communication between perforations in a particle-blocking perforation array of the filter sleeve and a fuel opening formed in the fuel injector case by way of the positioning of the filter sleeve upon the fuel injector case; and installing in an engine housing a fuel injector that includes the filter sleeve, the fuel injector case, and an electrically actuated valve assembly, such that the particle-blocking perforation array is positioned to filter fuel flowing from a fuel conduit in the engine housing into the fuel opening to cool the electrically actuated valve assembly.

* * * * *